Figure 1:
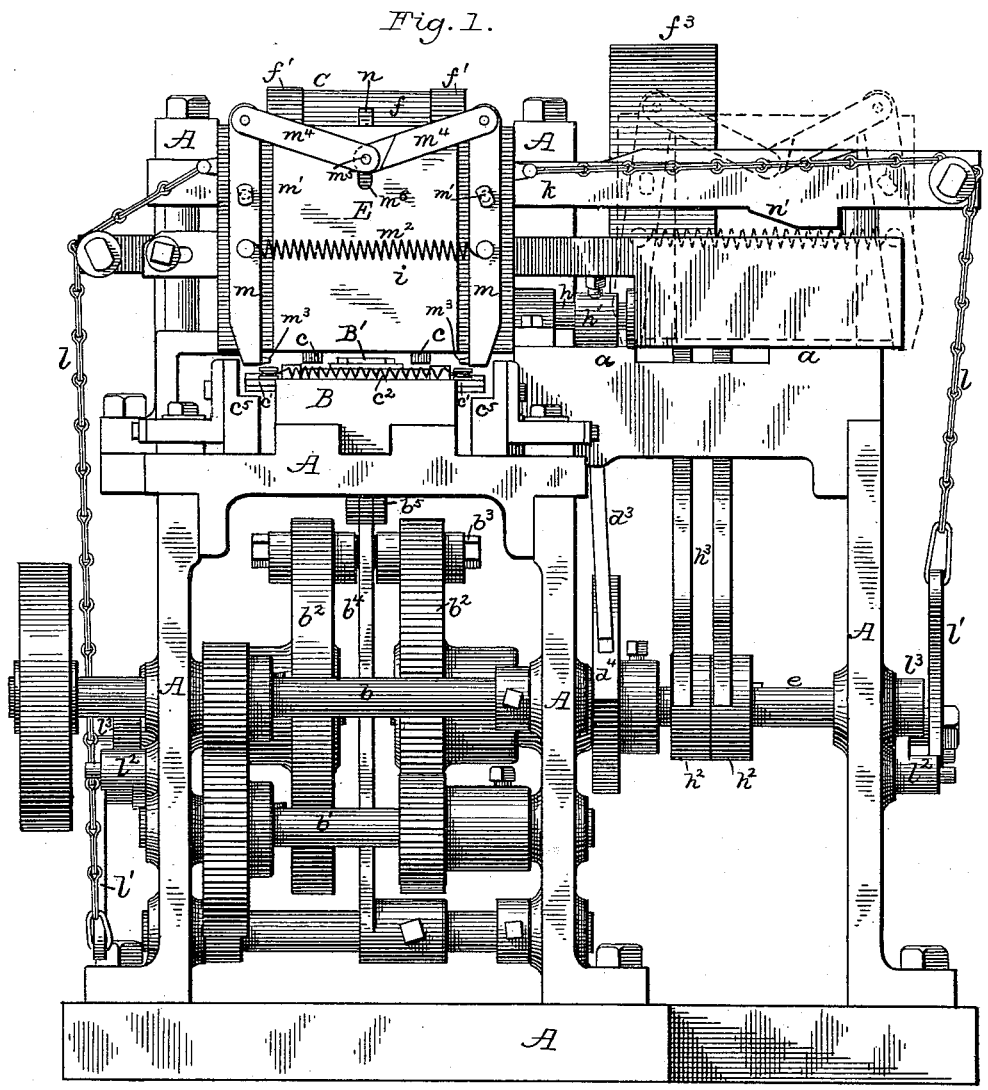

(No Model.)  8 Sheets—Sheet 1.

C. H. PERKINS.
HORSESHOE MACHINE.

No. 338,870.  Patented Mar. 30, 1886.

Attest:
Philip F. Larner.
Howell S. Bartle.

Inventor:
Charles H. Perkins.
By Wm. C. Wood
Attorney.

(No Model.)　　　　　　C. H. PERKINS.　　　　8 Sheets—Sheet 2.
HORSESHOE MACHINE.

No. 338,870.　　　　　　　　　Patented Mar. 30, 1886.

(No Model.) 8 Sheets—Sheet 3.

C. H. PERKINS.
HORSESHOE MACHINE.

No. 338,870. Patented Mar. 30, 1886.

(No Model.)  8 Sheets—Sheet 4.
C. H. PERKINS.
HORSESHOE MACHINE.

No. 338,870.  Patented Mar. 30, 1886.

(No Model.) 8 Sheets—Sheet 5.

C. H. PERKINS.
HORSESHOE MACHINE.

No. 338,870. Patented Mar. 30, 1886.

Attest:
Philip F. Larner
Nowell Bartlett

Inventor:
Charles H. Perkins.
By Wm C Wood
Attorney.

(No Model.) 8 Sheets—Sheet 6.

C. H. PERKINS.
HORSESHOE MACHINE.

No. 338,870. Patented Mar. 30, 1886.

Attest:
Philip F. Larner
Howell Bartle

Inventor:
Charles H. Perkins.
By Wm. C. Wood
Attorney.

(No Model.) 8 Sheets—Sheet 7.

C. H. PERKINS.
HORSESHOE MACHINE.

No. 338,870. Patented Mar. 30, 1886.

Attest:
Philip F. Larner
Howell Bartle

Inventor:
Charles H. Perkins
By
Attorney.

N. PETERS, Photo-Lithographer, Washington, D. C.

(No Model.) 8 Sheets—Sheet 8.
C. H. PERKINS.
HORSESHOE MACHINE.
No. 338,870. Patented Mar. 30, 1886.
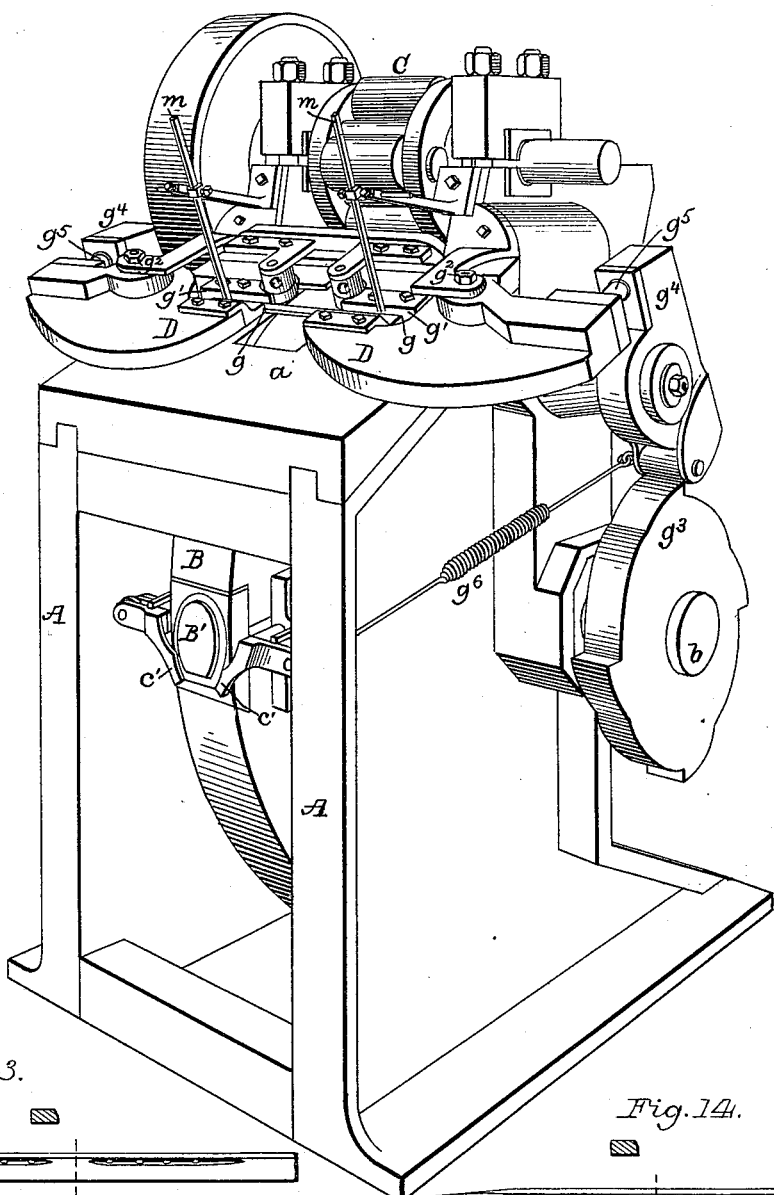
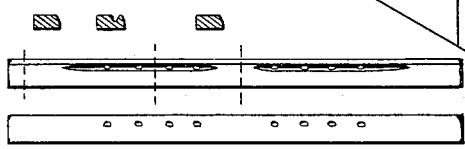
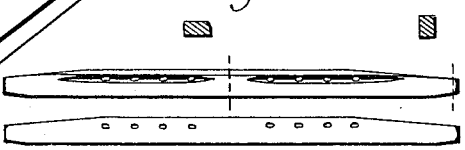
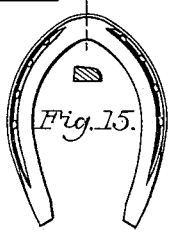
Attest:
Philip F. Larner
Howell F. Battle
Inventor:
Charles H. Perkins
By McC. Moore
Attorney.

ically classify them; but after describing certain

UNITED STATES PATENT OFFICE.

CHARLES H. PERKINS, OF PROVIDENCE, RHODE ISLAND.

HORSESHOE-MACHINE.

SPECIFICATION forming part of Letters Patent No. 338,870, dated March 30, 1886.

Application filed January 23, 1886. Serial No. 189,457. (No model.)

*To all whom it may concern:*

Be it known that I, CHARLES H. PERKINS, of the city and county of Providence, in the State of Rhode Island, have invented certain new and useful Improvements in Horseshoe-Machines; and I do hereby declare that the following specification, taken in connection with the drawings furnished and forming a part of the same, is a clear, true, and complete description of the several features of my invention.

In connection with the art of manufacturing horse and mule shoes, a large variety of machines and numerous improvements thereon have been heretofore devised and patented, and some of said machines have been relied upon practically for performing some two or more, but not all, of the several operations essential for producing a desirable shoe of the usual and well-known form. Other machines have been devised with a view to performing every operation, from taking a straight rod or bar of metal, giving it certain forms, then cutting it into proper lengths for each shoe, and finally turning out a finished shoe, and some of such machines have been heretofore patented.

It will be obviously impracticable within the limits of this specification to refer to each of said prior machines, or even to strictly classify them; but after describing certain well known types of machines, to which the main features of my invention exclusively pertain, it is believed that persons skilled in the art will be readily enabled to recognize the particular varieties of machines in which my present invention can be in whole or in part employed, and to also readily distinguish such machines from all others.

From my long experience as an inventor and patentee of horseshoe machinery and as a manufacturer of horseshoes, I believe that others skilled in the art will recognize at least two features in the business which have been limited to the long-continued and practical operations of myself and my associate, Richard W. Comstock. Of these two features, one is a hammering operation, which is performed after the blank has been bent into proper shape, and by which substantially the same or better condensing effect is produced as or than when a shoe is hammered with a hand-hammer upon an anvil; and the other feature consists in swaging, and thereby thickening, the metal which forms the heels of a shoe prior to the bending operation.

Now, certain important features of my present invention are applicable only to machines which embody hammering mechanism, and which also include a traveling forming-die. In Letters Patent issued to me June 1, 1858, I disclosed hammering and bending mechanism co-operating with a forming-die which was vertically reciprocated at intervals, but did not travel with a moving bed, as essential in my present machines.

Other machines containing a traveling forming-die have been devised (and patented) with a view to bending and hammering as consecutive operations; but the bending mechanism therein was so organized that no part of it could move along with the die and co-operate with the hammering mechanism in properly confining the blank at its forming-die during the hammering operation. Briefly stated, the radical difference in this connection between the said old machines last referred to and my improved machines is, that in said old machines a traveling forming-die co-operated (in bending a blank) with devices which did not and could not move forward with said die to the hammer, and if they had been so moved they would have obstructed the operation of the hammer, whereas in my present machines the traveling forming-die is used with certain co-operating bending devices which travel with the forming-die, and after exercising their bending function they then do duty as clamping devices during the hammering operation.

Other machines have heretofore been devised and long used by me in which hammering mechanism, a traveling forming-die, and a clamp were embodied; but those machines could only receive and operate upon blanks which had previously been bent in separate machines, as will be readily understood upon reference to Letters Patent issued to myself and my associate, Richard W. Comstock, May 28, 1867, and also to Letters Patent issued to me October 21, 1873, No. 143,781, and March 3, 1874, No. 148,085.

Certain other important features of my present invention are applicable only to machines in which the thickening of the metal at the heels of the shoe is performed by swaging the ends of a straight blank, or, in other words, swaging prior to the bending operation. This particular mode of operation places all machines embodying said last-referred-to features of my present invention wholly outside of, and distinct from, that large general class of prior machines in which the thickening of the metal at the heels of a shoe is accomplished by swaging the ends of the blank after it has been initially bent, and whether during or after making that final bend in the shoe, which consists in contracting the heels of the partially-bent blank. In no prior machines, except in those devised by myself and Mr. Comstock, my aforesaid associate, has this particular swaging operation been performed prior to bending. The value of swaging before bending has been long established, and it will be at once apparent, when it is considered, that swaging involves more power than any other one operation, and hence it should be performed on a blank at the most favorable time as to heat, and hence before any other operation; also, that if by inequalities of heat or density of metal at the two ends of a blank one end be elongated more than another by swaging, the blank can nevertheless be so centrally presented to a forming-die that the resulting shoe will have heels of uniform length, whereas if the swaging be done after the blank has been mainly bent, the metal must have cooled somewhat, and if one end be elongated more than another a trimming operation will be necessary.

In Letters Patent No. 64,903, issued to myself and said Comstock, the first horseshoe-machine was disclosed in which the straight blanks could be first swaged at their ends and then bent into form; but the blank having been thus swaged was transferred by hand to the bending mechanism. In Letters Patent issued to me October 21, 1873, No. 143,782, I disclosed for the first time a machine in which a straight blank was first swaged at its ends, and then, without further manipulation, it was engaged by the bending mechanism. In machines embodying my present improvements the swaging operation is first performed and then the bending; but they radically differ from said last-referred-to prior machines, in that the bending mechanism in said prior machines included a traveling forming-die and bending-studs which were automatically moved to and fro laterally toward and from said die, while the latter moved longitudinally to and fro between said studs, whereas in my present machines the bending mechanism includes the moving forming-die, two stationary studs, and two lever-jaws, which not only move to and fro laterally toward and from said die, but also move along with said die, and hence said lever-jaws are enabled to serve as clamps after completing the bending operation.

Moreover, as shown in my Letters Patent No. 143,782, the swaging and bending mechanism was so organized as to practically preclude the employment therewith of hammering mechanism. It should now be understood that I use in my present machines a straight blank prepared by rolling, cut in proper length for one shoe, and creased and punched, and hence my machines in their complete form first swage the ends of a straight blank, then initially bend it, than complete the bend at the heels of the shoe, and then, while firmly clamped at the forming-die and moving therewith, it is hammered. So long as these operations are thus performed in a machine embodying my invention, it is immaterial, so far as it relates to said invention, in what manner or by what means such other operations as are essential for producing a horseshoe may be performed. It should also be understood that machines embodying portions of my present invention can be employed either for bending alone or for swaging and bending, for hammering or for bending and hammering, although the best results will accrue if all of these operations be performed in proper succession in the same machine.

The importance of properly gaging a straight blank so that it may be always centrally delivered to bending mechanism as well as to swaging mechanism has heretofore been fully recognized by me, as will be readily seen on reference to many of the Letters Patent hereinbefore referred to; but I have now devised certain improvements in such gages for use in connection with blank-carriers which I have now devised for use in certain forms of machine embodying the main features of my present invention.

It will be readily seen that the embodiment of the most important features of my invention is not dependent upon any special form of machine, it being obvious that they are equally applicable to that well-known form of machine in which a single forming-die is employed upon and moving with a reciprocating sliding bed, and to such as contain a series of forming-dies mounted upon a bed which continuously carries said forming-dies forward, as will be hereinafter fully described.

After describing the several forms of machine illustrated in the drawings, the features of invention common to more than one of said forms, as well as such as are restricted to the particular form of machine to be first described, will be specified in the several clauses of claim hereto annexed.

Figure 2:
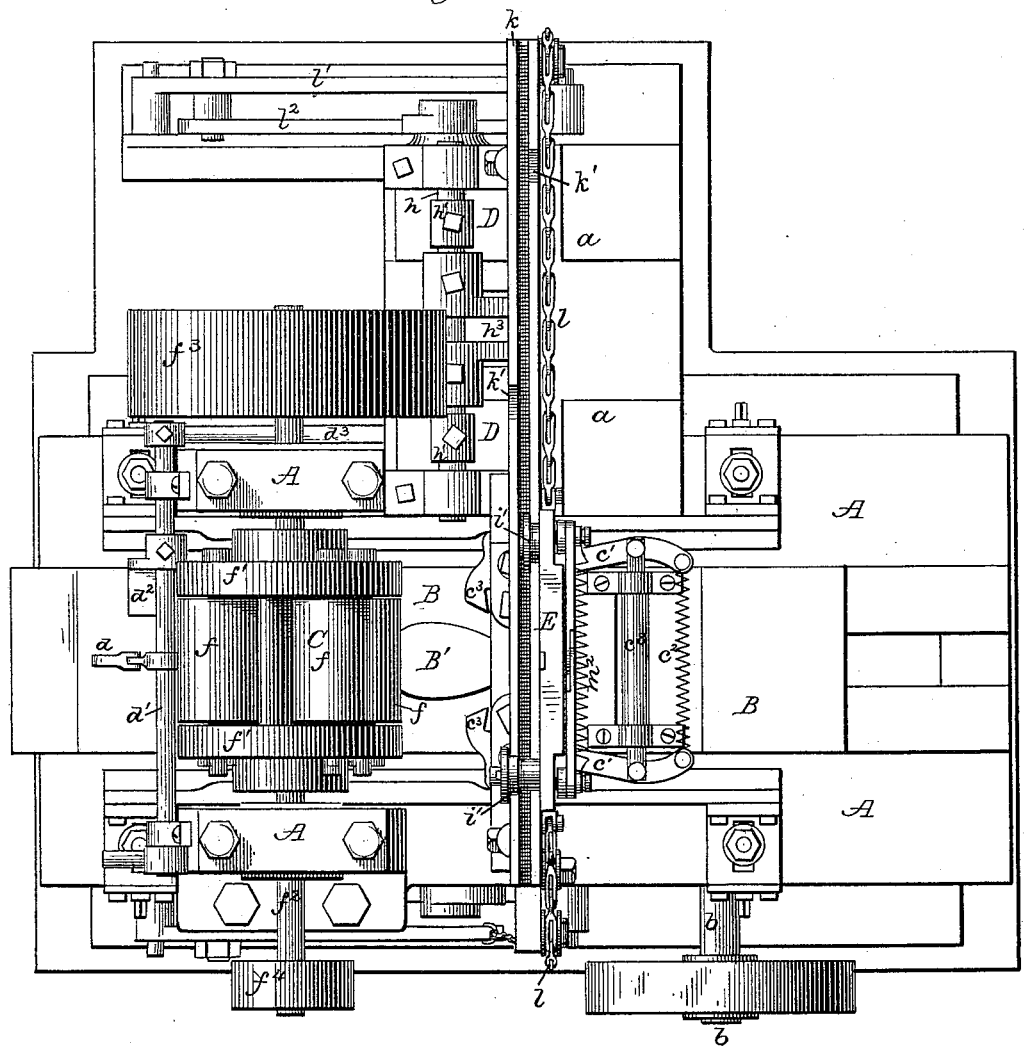
Figure 3:
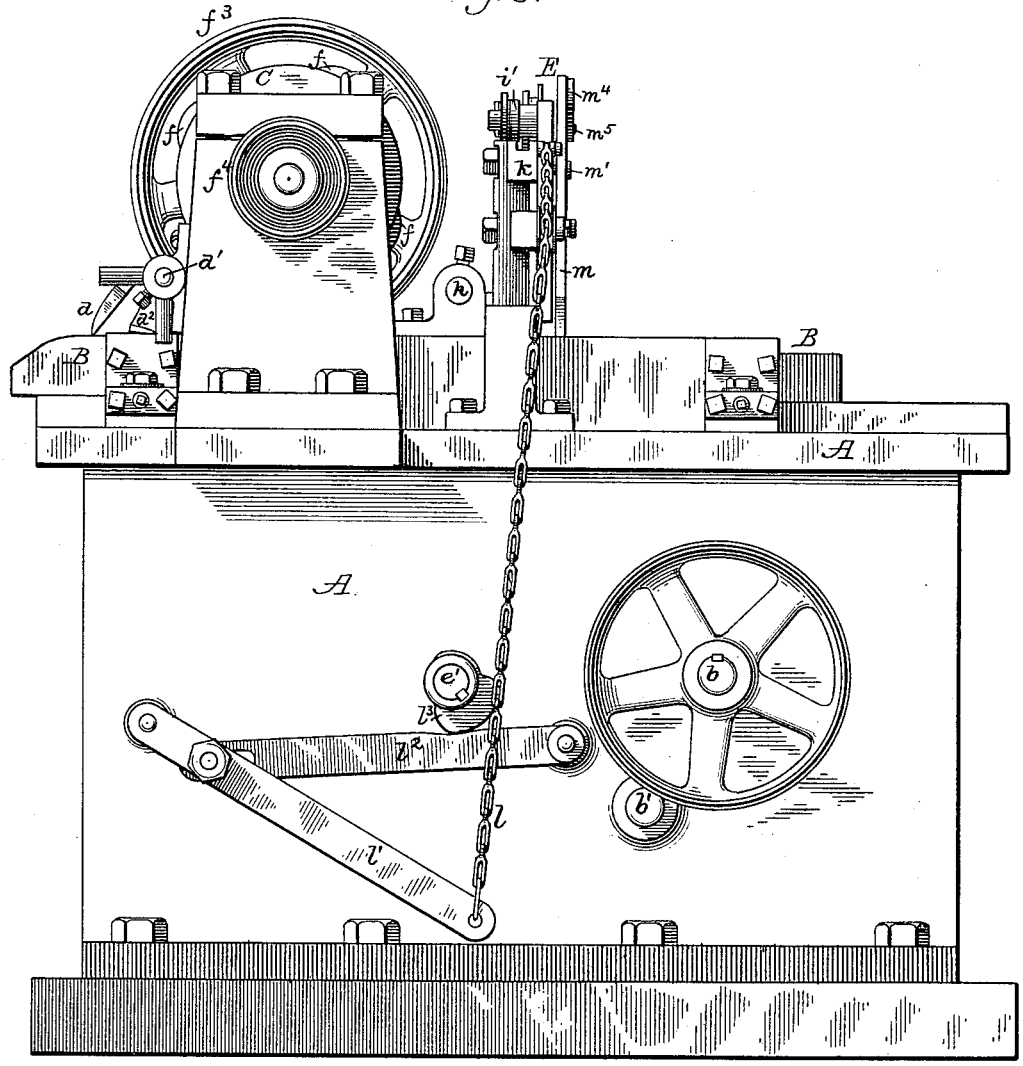
Figure 4:
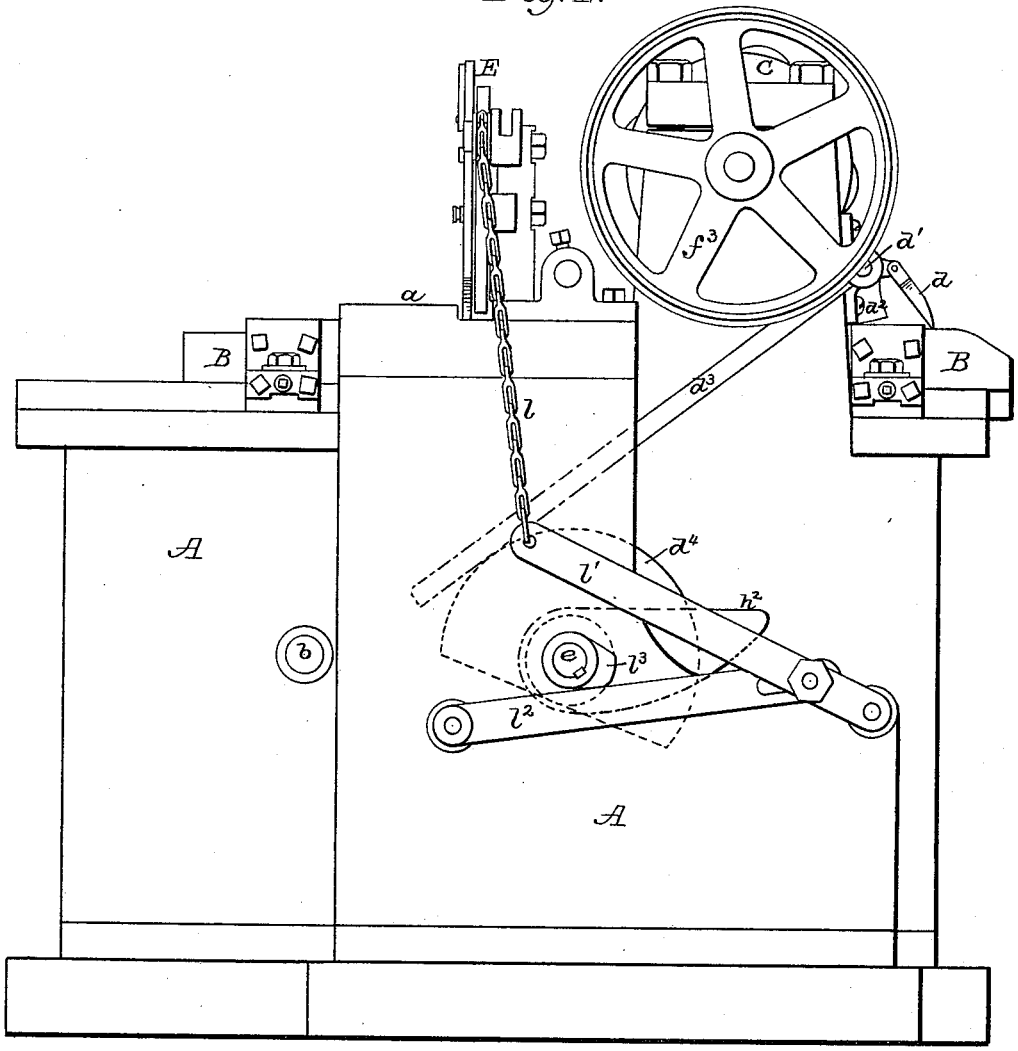
Figure 5:
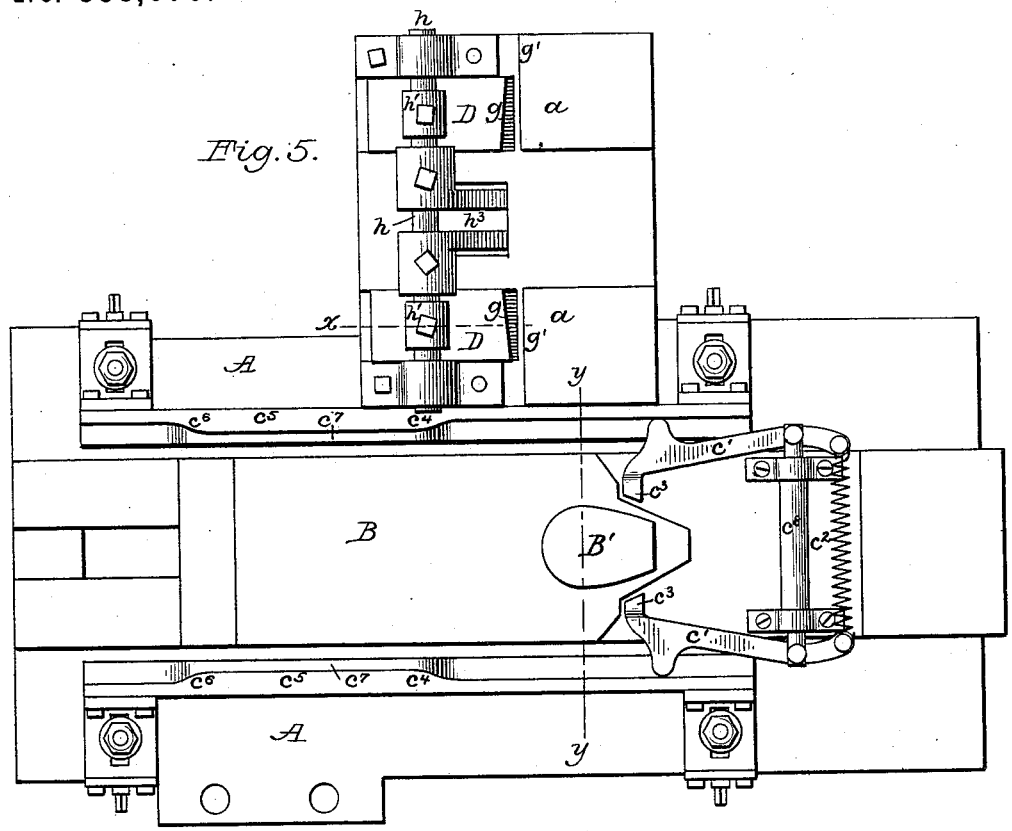
Figures 6, 7:
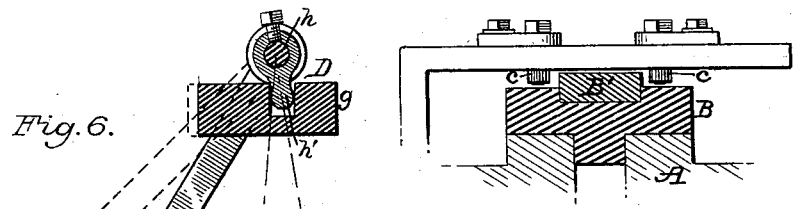
Figure 8:
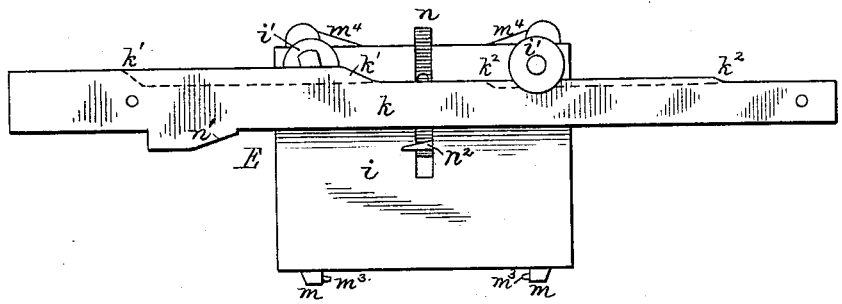
Figure 9:
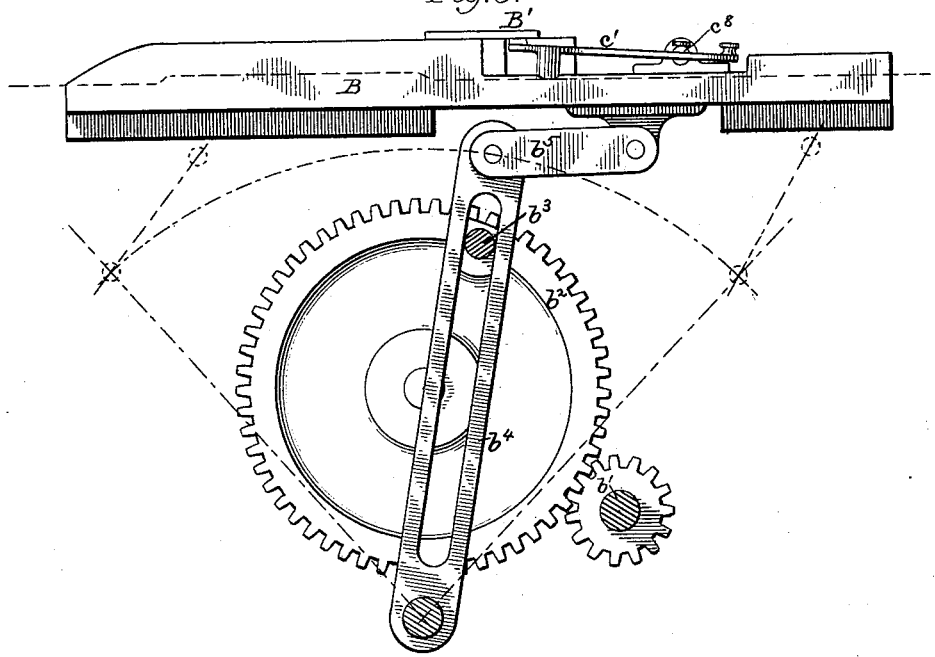
Figure 10:
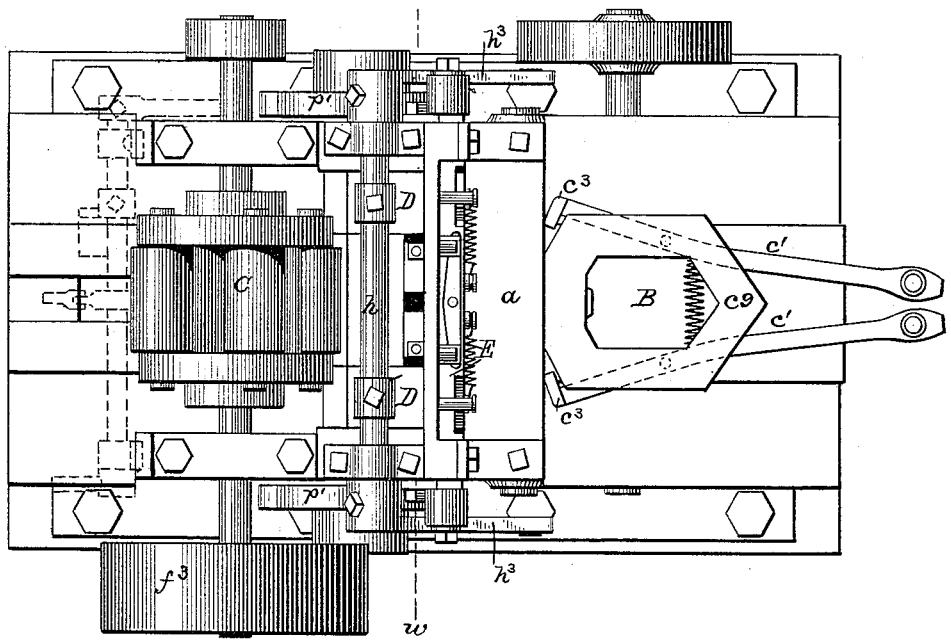
Figure 11:
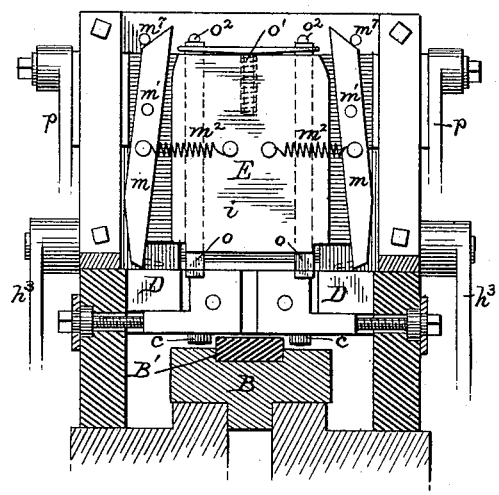

Referring to the eight sheets of drawings, Figure 1 is a front elevation of a machine embodying the several features of my invention in what I deem a specially desirable form. Fig. 2 is a top or plan view of the same. Figs. 3 and 4 respectively illustrate the two sides of the same. Fig. 5 is a plan view of the portion of the machine which underlies the hammering mechanism and the centering and delivering mechanisms, these latter being removed for more clearly showing the bending and the swaging mechanism. Fig. 6 is a sectional view of one of the swages on line x, Fig. 5, and its operating mechanism. Fig. 7 is a lateral vertical sectional view of the bending mechanism on line y, Fig. 5. Fig. 8 illustrates the centering and delivering gage or blank-carrier in rear view and a raceway on which it travels. Fig. 9 illustrates in side view a sliding bed on which the forming or bending die is carried and its operating mechanism detached from the machine. Fig. 10 in plan or top view illustrates a similar but more compact machine embodying the centering and delivering mechanism in a modified form. Fig. 11 is a front view of the centering and delivering mechanism and a partial vertical cross-section of the machine on line w, Fig. 10. Fig. 12 in perspective illustrates a machine of a different form embodying swaging, bending, hammering, and centering mechanism in accordance with my invention, but having no carrying and delivering mechanism. Figs. 13, 14, and 15 in one or more views each illustrate, respectively, a straight blank, a swaged blank, and a shoe as produced with either of the machines illustrated.

I will first describe the form of machine illustrated in Figs. 1 to 9, inclusive, and thereafter describe the two other forms illustrated, and point out the features of invention which are common to the first and both or either of the others. The frame A of this machine may be widely varied in construction, due provision being made for suitable rotative and slide bearings for the several movable parts of the machine, which will be hereinafter designated. Said frame is also so constructed as to afford a stationary feeding bed or table, $a$, which is cut away centrally, as shown in Figs. 1 and 2, on which properly-heated straight blanks are placed and delivered singly by hand-tongs to the machine. Sundry stationary guides or cam-surfaced blocks and plates are also mounted on said frame, each of which will be described. The sliding bed B is mounted on the frame in suitable guide-bearings, and is reciprocated to and fro, when power is applied thereto, by way of the shaft $b$, geared to the counter-shaft $b'$, geared to one of two crank-disks, $b^2$, carrying a wrist-pin, $b^3$, within a long slot provided therefor in a rock-shaft lever, $b^4$, coupled at its upper or free end to said sliding bed by a link, $b^5$, as clearly shown in Figs. 1 and 9. This bed carries the bending or forming die B', and this latter, for initially bending, co-operates with two stationary pendent studs, $c$, (preferably provided with friction-rollers,) and also with two parallel horizontal levers, $c'$, carried on said bed. A retractile spring, $c^2$, at their rear ends, maintains the working ends $c^3$ of said levers normally wide apart, but permits them to be forced inward and to operate as automatic jaws in finally bending the two ends of a shoe-blank into contact with the forming-die B'. This inward or compressing movement of said jaws $c^3$ is accomplished by means of cam-surfaces $c^4$ on the stationary rails or bars $c^5$, firmly mounted on the frame of the machine. The front ends of said jaws, at their outer edges, are moved into contact with said cam-surfaces, and they are maintained in that position during the further forward movement of the bed, or at least until said jaws reach the releasing cam-surfaces $c^6$, thus completing the bending operation and retiring from contact with the shoe. The jaws $c^3$, when the sliding bed is at either end of its stroke, are normally depressed; but as they approach the cam-surfaces $c^4$ they are lifted by an upwardly-curved surface in each rail, to supporting-surfaces $c^7$, and on passing the cam-surface $c^6$ said jaws are dropped again, as will be clearly obvious on an inspection of Fig. 5. In order that the jaw-levers may have a minimum of lost motion on their pivots, it will be seen that both levers are mounted on vertical pivots at the two ends of a rock-shaft, $c^8$, in bearings on the sliding bed. During the backward movement of the bed the jaws merely repeat the movements described, and the shoe on the die is removed therefrom by the pawl or finger $d$, Figs. 2 and 3, pendent from a rock-shaft, $d'$, co-operating with a pendent clearer, $d^2$, on said rock-shaft. Said clearer is wedge or blade shaped, and occupies a position slightly above the surface of the bed and so near the path of the die that as the latter approaches with a shoe thereon the clearer is interposed between the top of the bed and one side of the shoe, and then said clearer is rocked by means of an arm or lever, $d^3$, vibrated by a cam, $d^4$, which is mounted upon a shaft, $e$, which serves as the axis of the geared or toothed crank-disk $b^2$. The rocking or lifting movement of the clearer so frees the shoe from the die that when the bed next moves backward the finger $d$ engages with the shoe and holds it until the bed approaches its rearward position, so that the shoe can be freely dropped therefrom. Above the bed the revolving hammer C is mounted. Said hammer in its best form is composed of the several rollers $f$, on axes having bearings in disks $f'$, mounted on a shaft, $f^2$, and provided with a driving-pulley, $f^3$. This shaft $f^2$ may also serve as the main or driving shaft of the machine, when provided with a pulley, $f^4$, and belted to a pulley on the shaft $b$, before described. At one side of said bed, and slightly higher than it, are the swaging-dies D. (Best illustrated in Figs. 5 and 6.) There are two of these dies, which move together in a horizontal plane, and their working-faces $g$ co-operate with stationary abutting faces $g'$, at the rear edge of the feeding-table $a$. These dies are in the form of blocks supported on the frame so that they can slide to and fro longitudinally, and this movement is imparted to them by means of a rock-shaft, $h$, having fingers $h'$, which occupy slots or recesses in the backs of said blocks, and said rock-shaft is actuated from the shaft $e$ by way of one or two cams, $h^2$, and one or two pendent levers, $h^3$. These levers $h^3$ and the fingers $h'$ are each provided with clamp-screws and are rotatively mounted on said rock-shaft, thus providing for desirable variations in adjustment. The working-faces of the dies are varied in contour according to special requirements.

As thus far described, it should be understood that the straight blank, Fig. 13, is swaged by the dies D into the form shown in Fig. 14, and is then bent and hammered into the form shown in Fig. 15, and it now remains for me to describe the manner in which the blank is delivered to said swaging-dies in an accurately-centered position, and is conveyed therefrom and delivered to the bending mechanism. These functions are performed by the blank-carrier E, which is clearly shown in Figs. 1, 2, 3, 4, and 8. This carrier embodies a pendent rectangular block or plate, $i$, which is suspended by means of roller-hangers $i'$ from a double rail, $k$, which affords two tracks for said hangers, and is mounted on the upper portion of the frame of the machine, and extends from above the swaging-dies across and above the sliding-bed B and in front of the studs $c$, with which the die B' co-operates, for initially bending a blank. This reciprocating movement of said blank-carrier block is accomplished as follows: Two chains, $l$—one at each end—are attached to said block. At each side of the machine there is a lever, $l'$, pivoted at one end to the frame of the machine, and at its other or free end it is coupled to its respective chain $l$. Each lever $l'$ is in turn coupled by means of a sliding pivot with a second pivoted lever, $l^2$, with the upper edge of which a cam, $l^3$, engages. The two cams $l^3$ are in line with each other, and one of them is on the outer end of the shaft $e$, before described, and the other is on the outer end of the axes or shaft $e'$ of the non-toothed crank-disk $b^2$. The cams $l^3$ are oppositely set on their axes, so that as one depresses one of the levers and draws the carrier toward it the other cam permits its lever to rise to its proper height, and thereafter at a proper time to depress said lever and cause the carrier to make its return movements, and correspondingly lifting the lever $l'$ on the other side of the machine. In addition to said to-and-fro horizontal movements, said carrier-block makes certain vertical movements during its transit, and these are provided for by inclines or cam-surfaces on the upper edges of the double rail K, as will be seen in Figs. 2 and 8. The inclined planes at K' K' serve to lift and lower the carrier when over or adjacent to the feeding-bed $a$, and the planes K² K² perform that service when the carrier is over or adjacent to the sliding bed B. The carrier also embodies a centering-gage by means of which the middle of each blank is made to always occupy a certain position regardless of such slight variations in length as are liable to occur. Heretofore in my prior machines, and as disclosed in my prior patents, centering-gages are employed; but now, for the first time, I employ such a gage on a blank-carrier. Prior gages have been in the form of pendent springs of as near equal resiliency as may be practicable, and such may be employed with fair results in my present machines; but I have now devised for this form of machine a centering-gage embodying two pendent fingers controlled by one spring, and thus am enabled to secure uniform resiliency. As seen in Figs. 1 and 8, the centering-gage includes the pair of pendent fingers $m$, pivoted at $m'$, on the front face of the carrier block or plate $i'$, and coupled together below said pivots by the retractile spring $m^2$, and at their lower ends said fingers have coincident studs $m^3$, which enable said fingers to support a blank interposed between them and above their studs. The retractile action of the spring is restricted by means of two links, $m^4$, pivoted thereto, and coupled together by a pivot-stud, $m^5$, which freely occupies a vertical slot, $m^6$, in the carrier-plate $i$. The opening movement of the fingers for receiving a blank is accomplished through a vertically-sliding rod or bar, $n$, guided by a vertical slot at the rear side of the plate $i$, and coupled to the fingers by way of the pin or stud $m^5$ and links $m^4$, so that when said rod $n$ is lowered it will cause the lower ends of said fingers to move outwardly, and also so that said rod will be maintained normally in its highest position by the operation of the spring $m^2$. These fingers need be thus controlled for receiving a blank only when the carrier is adjacent to the feeding-table $a$, and for depressing the rod $n$, I rely upon an inclined plane or cam surface, $n'$, at the lower rear edge of the rail $k$, and a shoe, $n^2$, on said rod, as clearly shown in Fig. 8, so that after the carrier has been lifted in moving along its rail toward the feeding-bed, and is then further moved in that direction, the shoe $n^2$ engages with the cam-surface $n'$, thereby depressing said rod and causing the lower ends of the fingers to open wide for receiving a blank between them.

As thus far described, it will be seen that the revolving hammer is continuously operated, but that it is effective only while a shoe is being carried by the sliding bed beneath said hammer. For obtaining the best results, I prefer that the sliding bed, in advancing to perform the bending operation, should move at a gradually-decreasing speed and then move toward and beneath the hammer at a comparatively slow speed, and on making its return-stroke to move at high speed, and these conditions are well provided for, as will be readily seen from an inspection of Fig. 9. The intermitting action of the blank-carrier, and also of the swaging-dies, is readily timed with exact reference to the movements of the sliding bed, the crank disks $b^2$ being continuously rotated, and all of the rotative cams being connected to the axes of said disks.

In view of the explanations already given as to the separate mode of operation of each of the several devices described, it is believed that the operation of the machine as a whole need only be briefly described as follows: The machine being in motion, and the blank-carrier being at its right-hand position, as shown in dotted lines in Fig. 1, a blank is placed flatly and longitudinally on the table $a$, and pushed rearward into and between the opened fingers $m$ of the centering-gage, so as to be supported by their studs $m^3$. The carrier then moves slightly toward the left hand and drops, thus causing the fingers to close against the ends of the blank, and locating its middle centrally with relation to the two swaging-dies D, which then move forward, swage the ends of the blank, and promptly retire, because of the shape of the cam or cams $h^2$, and also because the pendent levers $h^3$ are heavy enough to serve as weighted levers, and hence they promptly swing toward the cam or cams after their release therefrom and move the die-blocks rearward. After the swaging-dies have retired, the carrier then travels toward and over the bed, and just before it terminates its traversing movement it falls slightly, and thus locates the blank with its middle exactly midway of the two pendent studs $c$, and in line with the center of the forming-die B'. The sliding bed, as it then moves forward, abuts the front end of the forming-die against the front edge of the blank at its center, and after said blank has been thereby forced against the studs $c$ it is then forced between them, thus providing the initial bend. Succeeding this, the two jaws $c^3$ of the levers $c'$ move inward, completing the bend in the shoe. The bed, on further advancing, slowly presents the shoe to the action of the hammer, which progressively operates thereon from toe to heels, and after passing the hammer the clearer $d^2$ lifts one side of the shoe from the die B', so that after the sliding bed has started on its return movement the pawl $d$ will engage with the shoe, inside of its toe, and hold it until free to drop after the bed has passed from beneath it. In the meantime the blank-carrier will have returned to the feeding-table $a$, and be ready to receive another blank.

While I prefer that the swaging-dies be located, as already described, at one side of the sliding bed, and to employ therewith a laterally-traveling blank-carrier, it is to be understood that I do not limit certain features of my invention to that form of machine—as, for instance, in Figs. 10 and 11 I illustrate a machine having swaging-dies located above the sliding bed, and a blank-carrier which has vertical movements only. In this machine the frame A is modified to harmonize with the particular arrangement of the movable parts of the machine. The sliding bed B has the same die, B', and similar studs, $c$. The lateral bending-jaws $c^3$, on levers $c'$ are, as before, mounted on and carried by the bed, but are differently arranged, and are opened and closed by means of a stationary cam-plate, $c^5$, corresponding in function with the cam-surfaces $c^4$ and $c^6$, previously described. The hammer C is as in the first described machine. The swaging-dies D, with their rock-shaft $h$, levers $h^3$, and their operating mechanism, are all substantially as before described; but said dies are placed directly over the sliding bed B, and therefore the feeding-table $a$ is correspondingly located. The blank-carrier E in this machine may be provided with a centering-gage mainly like that already described; but I here illustrate a gage in which the fingers $m$ may or may not have the coincident studs $m^3$, before described, for supporting a blank. In this carrier the supporting function is performed by two brackets, $o$, fitted with stems which slide in vertical holes in the carrier-block $i$, and are lifted by a spring, $o'$, except when they are depressed with relation to the carrier-block by being forced upward against projecting pins $o^2$ in an upper stationary crosswise portion of the frame of the machine, so that when the carrier is elevated to its fullest extent, the brackets $o$ are ready to receive a blank, and then, when the carrier descends slightly, said blank will be lightly gripped between said brackets and the lower edge of the carrier block or plate $i$. The two centering-gage fingers $m$ on pivots $m'$ may be coupled by links and controlled by one spring, as before described; but, as here shown, each has its own spring $m^2$, and their lower ends are moved toward each other by said springs and moved outward by means of the stationary projecting pins $m^1$, which engage with the upper ends of said fingers during a portion of the vertical movement of the carrier. This carrier is mounted to move freely in vertical guides in the frame of the machine, and is vertically reciprocated by means of sliding bars $p$, which rest at their lower ends upon or are engaged by suitably-formed revolving cams $p'$. The blank-carrier E in Fig. 11 is at its highest position, and with its blank-supporting brackets $o$ in line with the top of the feeding-table $a$, Fig. 10, and ready to receive a blank. On receiving a blank, the carrier then descends, the gage-fingers close in upon the two ends of the blank, and center it by the time it arrives opposite the faces of the swaging-dies D, and then the carrier rests. The swaging-dies then operate and then recede, whereupon the carrier descends still farther, until the blank occupies the same horizontal plane as the studs $c$, and in front of the forming-die B'. The brackets $o$ are composed of steel and firmly backed by the studs $c$, so that as the die B' advances the the blank is bent and carried forward. In their best form this variety of supporting-bracket should be light, and located so that each of them will be close to the outer side of the adjacent stud $c$, and thus enable said studs to bear the entire brunt of the bending action. It will be clearly obvious that if these brackets be dispensed with, and the gage-fingers be provided with the studs $m^3$, previously described, said studs will perform the supporting function, as in the other machine.

It is to be understood that the machine illustrated in Figs. 10 and 11 embodies certain specific features of invention which are not embraced within the claims of my present application, and therefore said features will be made the subjects of a separate application. (See Serial No. 189,633.)

It will be seen, if the blank-carriers were removed from either of these machines, that they could by successfully employed, if run at proper speed, by feeding the blanks to the swaging mechanism by means of hand-tongs, and then in like manner placing said blanks in proper position to be engaged by the forming-die and pendent studs.

It should be here observed that the swaging jaws or dies D in these sliding-bed machines are not located in front of and in the same horizontal plane as the pendent studs, simply because they would occupy space in the paths traversed by the long lever-jaws, which are mounted on and travel with the die-bed. The reciprocation of the die-bed involves rapid movements which render the use of long horizontal lever-jaws specially applicable; but if such machines were to be slowly operated another form of lever-jaws could be employed, mounted on vertical rock-shafts and arranged, as will be hereinafter described, to fall below the plane of the bed during the backward and also during a portion of their forward movement, and with such lever-jaws the swaging-dies would be located in the same plane with the pendent studs, as will be hereinafter fully shown.

While I would generally prefer the sliding bed and a blank-carrier of some form, I have obtained good results with an entirely different form of machine, in which no blank-carrier need be used, and in which the die-bed moves continuously in the same direction, and hence a series of forming-dies can be employed. In this form of machine I have for the first time embodied swaging, bending, and hammering mechanism—as, for instance, as illustrated in Fig. 12. In this machine the frame A is so formed as to meet the requirements of the operating mechanism. The bed B is in disk form, rotatively mounted on a heavy shaft, $b$, driven by means of heavy gearing, (not shown,) and on the periphery of said disk there is a series of forming dies, B'. As here shown, said bed is arranged for four forming-dies at regular intervals. The hammer C is precisely as before described, and is located above the bed and in a vertical line with its shaft $b$. The swaging-dies D are located in front of the hammer and over the bed, in a manner resembling the swaging-dies in the machine last described; but said dies are varied in form and in their operating mechanism, so as to better harmonize with the accompanying devices. The swaging-die blocks are segmental in form, and have their working-faces at $g$ and their co-operating faces at $g'$; but they are centrally pivoted to the frame of the machine at $g^2$, and are moved for swaging by means of cams $g^3$ on the shaft $b$ and intermediate levers, $g^4$, which are coupled to the outer ends of the swaging-die blocks by links $g^5$, and when the cams $g^3$ release the levers $g^4$ the latter are controlled by retractile springs $g^6$, which cause the die-faces to promptly retire after completing their work. The swaging-die-operating mechanism is here shown at but one side of the machine, it being understood that the same is duplicated at the opposite side. The stationary bending-studs $c$ are as in the other machines; but in this case one pair of said studs co-operates successively with the four forming-dies B'. The centering-gage in this machine is in form precisely as used in my machines as heretofore patented, and it consists of the two pendent spring-fingers $m$, between which a blank is placed endwise and dropped or pushed downward by hand. The initial bending of a blank is performed by each forming-die and the studs $c$, as in the machines hereinbefore described, and the final bend is accomplished by levers $c'$, which are mounted in pairs on the bed adjacent to each forming-die, and are operated by the moving bed and stationary cam-surfaces between the studs $c$ and the hammer. The inclined surface $a$ in front of the studs $c$ corresponds in some respect with the feeding-table of the previously-described machines, although it supports the blank when centered by gage-fingers and during the swaging operation, but its rear edge does not afford, as in said other machines, the surfaces $g'$ with which the swaging-dies co-operate. As the bed revolves, the shoe drops from the forming-die by gravity, but clearers, if need be, can be located beneath the front end of the inclined table-surface $a$, and be in the form of stationary blade-shaped projections, which, as the bed revolves, will be interposed between said bed and a shoe on the forming-die, so as to lift the toe and then free it from the die. The lever-jaws $c'$ being free to be vibrated during the operation of such cleavers, each of the latter will have ample space for it to occupy between the forming-die and the adjacent jaw as the die moves onward. As the forming-dies approach the bed $a$, the lever-jaws are dropped below the periphery of the bed and then raised after passing the swaging-dies and pendent studs. This machine embodies many features of invention which cannot properly be embraced herein, and therefore said features will be made the subjects of a separate application for Letters Patent. (See Serial No. 190,428.)

Each of these forms of machine embodies the main features of my present invention, and although I am aware that said features may be otherwise organized and varied more or less in form and appearance, and with many variations in minor features of construction and arrangement of the several parts essential in a horseshoe-machine, it is believed that the forms shown will be ample guides to persons skilled in the art for enabling them to apply said features of my invention in such form as may by them be deemed most desirable.

In all of these forms of machine I have shown the rotary hammer, and that is the best known to me for rapid and effective execution; but a reciprocating hammer, as shown, for instance, in my prior Letters Patent of June 1, 1858, could be successfully employed, and without departure from the main features of my invention.

Having thus described my invention, I claim as new and desire to secure by Letters Patent—

1. In a horseshoe-machine, the combination, substantially as hereinbefore described, of a hammer, a shoe-forming die mounted on a movable bed below said hammer, stationary studs co-operating with said die for making an initial bend in a shoe-blank, and a pair of automatic jaws mounted on said bed and moving with said die for completing the bend, and thereafter clamping the blank and confining it at the forming-die while passing to and beneath the hammer and during the hammering operation.

2. In a horseshoe-machine, the combination, substantially as hereinbefore described, of a pair of swaging dies or jaws for thickening the ends of a straight shoe-blank, a hammer, a shoe-forming die mounted on a movable bed below said hammer, stationary bending-studs co-operating with said forming-die for making an initial bend in a blank after receiving it from the swaging-dies, and a pair of automatic lever-jaws mounted on said bed for making a finishing-bend in said blank, and thereafter clamping it at the forming-die while passing to and beneath the hammer and during the hammering operation.

3. In a horseshoe-machine, the combination of a movable bed, a forming-die mounted on said bed, a pair of stationary studs co-operating with said forming-die for initially bending a blank, and a pair of automatic lever-jaws mounted on said bed adjacent to and moving with said die for completing the bend in the blank, and thereafter serving as a clamp for confining the fully-bent blank at the forming-die.

4. In a horseshoe-machine, the combination, substantially as hereinbefore described, of the hammer, the centering-gage, the swaging-dies for thickening the ends of a straight blank, and the bending mechanism consisting of the movable die-bed, the forming-die, the stationary pendent studs, and the automatic lever-jaws, these latter also operating as clamps during the hammering operation.

5. In a horseshoe-machine, the combination, substantially as hereinbefore described, of the sliding die-bed, the forming-die, the studs, and the automatic lever-jaws, all co-operating for bending a blank, the swaging-dies for thickening the end of a straight blank, and the blank-carrier for automatically engaging with a straight blank at the swaging-dies and delivering it to the bending mechanism.

6. In a horseshoe-machine, the combination, substantially as hereinbefore described, of swaging-dies for thickening the ends of a straight blank, a hammer, a sliding die-bed below said hammer, the forming-die on said bed, the stationary bending-studs co-operating with said die in making the initial bend in a swaged blank, the automatic lever-jaws co-operating with said forming-die for making the finishing-bend in a blank, and thereafter serving as a clamp for confining said blank at said die during the hammering operation, and a blank-carrier for transferring blanks from the swaging-dies to the bending mechanism.

7. In a horseshoe-machine, the combination, substantially as hereinbefore described, of a pair of swaging-dies for thickening the ends of straight blanks, a movable forming-die co-operating with stationary pendent studs for bending a swaged blank, and a blank-carrier having a centering-gage thereon, whereby blanks are accurately centered and delivered with uniformity first to the swaging-dies and then to said bending mechanism.

8. In a horseshoe-machine, the combination, substantially as hereinbefore described, of the die-bed, the forming-die, and the pendent studs, all co-operating for initially bending a blank, the swaging-dies at one side of said bed, and the blank-carrier movable between the swaging-dies and the bending mechanism, whereby on receiving a straight blank said carrier may deliver it to the swaging-dies, then convey the swaged blank to the bending mechanism, and then be returned for another blank.

9. In a horseshoe-machine, the combination, with the swaging-dies and the bending mechanism, of a rail overhanging said dies and extended thence over said bending mechanism, and a blank-carrier mounted on said rail and coupled by chains with two oppositely-vibrated levers, substantially as described.

10. In a horseshoe-machine, the combination of the swaging-dies, the bending mechanism, the horizontally-reciprocated blank-carrier, and the carrier-supporting rail provided with inclined planes, substantially as described, whereby during the forward movement of said carrier on said rail it is first dropped at the swaging-dies, is then moved to the bending mechanism, and then dropped.

11. In a horseshoe-machine, the combination, with the swaging-dies and the bending mechanism, of the blank-carrier embodying a centering-gage, the rail on which said carrier is mounted, the sliding rod on said carrier, coupled to the centering-gage, and the stationary inclined plane, substantially as described, for engaging with said sliding rod and spreading the arms of the centering-gage when above the swaging-dies.

12. In a horseshoe-machine, the combination, with a blank-carrier block, of the centering-gage fingers pivoted to said block, a spring common to both of said fingers, and a sliding rod in said block and coupled to both of said fingers above their pivots, substantially as described.

13. In a horseshoe-machine, the combination, with a blank-carrier block, of a pair of spring-controlled fingers pivoted to said block, and provided at their lower ends with coincident projecting studs, substantially as described.

CHARLES H. PERKINS.

Witnesses:
G. LOUIS BOWEN,
CHARLES R. STARK.